United States Patent Office 3,017,214
Patented Jan. 16, 1962

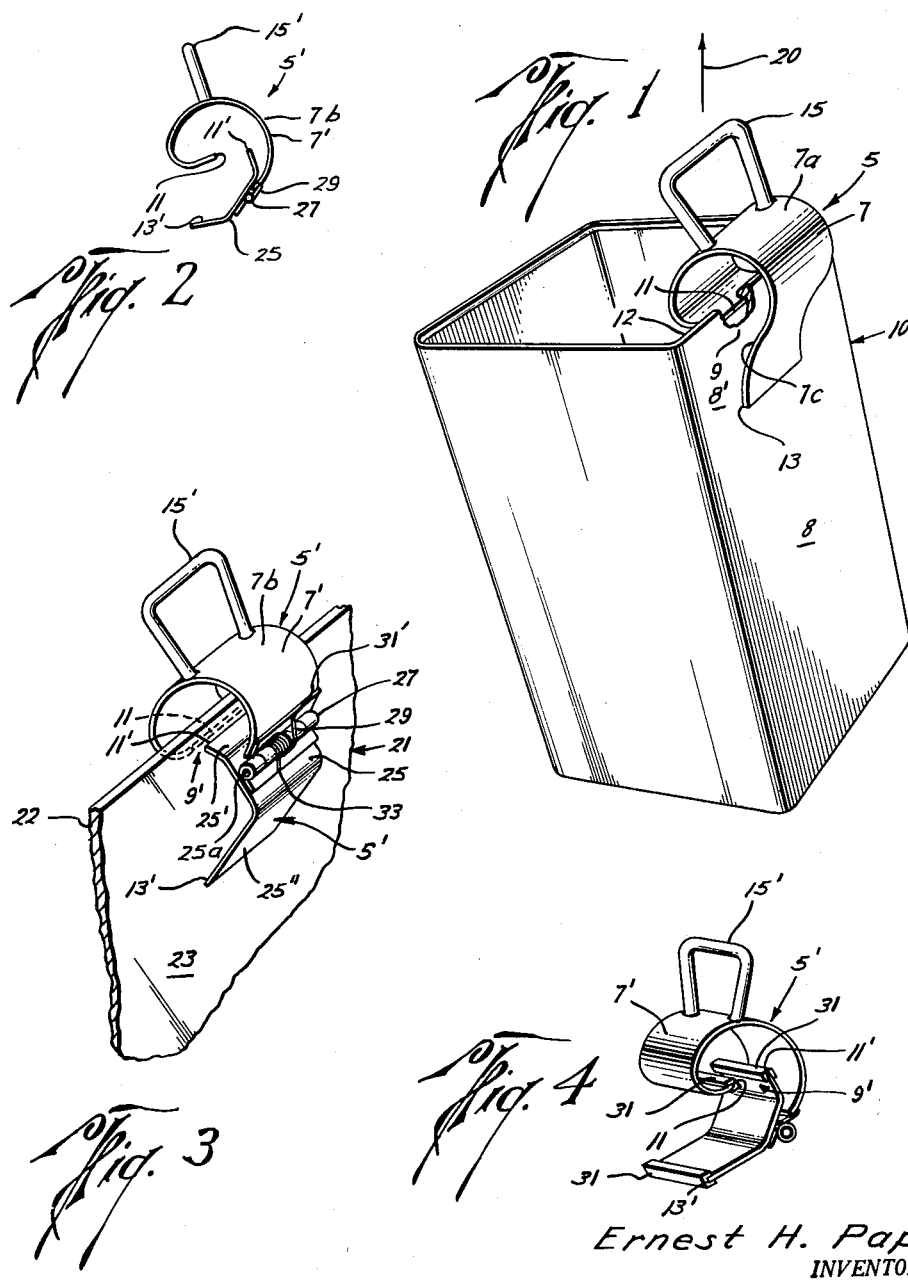

3,017,214
LIFTING AND CARRYING DEVICE
Ernest H. Pape, 2213 Pech Road, Houston 24, Tex.
Filed Sept. 4, 1959, Ser. No. 838,283
2 Claims. (Cl. 294—31)

The present invention relates to a device for lifting and carrying members such as containers, cans, sheet material and the like.

It is common practice for both wholesale and retail nurseries to grow plants and shrubs in cans. This size container permits the shrub or plant to develop a root system during the normal period of time that the plant or shrub will be kept by the nursery, and although the container is somewhat difficult and bulky to handle, it can be moved around so that it can be moved about from location to location at the nursery, and can, of course, be transported to the place of planting. However, such containers generally have sharp edges, and after the plant has grown for a while, it can be appreciated that the size of the plant, as well as the size of the container and the sharp edges of the container, make it extremely difficult to handle the container and carry it about easily.

An object of the present invention is to provide a device which can be quickly and easily positioned on a container, such as a can, to thereby permit the container to be carried about from location to location as desired.

Still a further object of the present invention is to provide a carrying and lifting device for a container which device is of relatively simple construction and which can be easily and readily positioned on the container for lifting and carrying the container, and which may be easily and quickly disengaged therefrom after use.

Yet a further object of the present invention is to provide a lifting and carrying device for a container which firmly grips the container, and which device is provided with a relatively large surface area for engaging the container to distribute the load of the container over a relatively large surface area to thereby inhibit rupture of the container.

Still another object of the present invention is to provide a carrying device of relatively simple construction which involves a minimum of moving parts, and which can be manufactured and sold inexpensively.

In addition to carrying containers, it can be appreciated that the present invention also has application in lifting and carrying various objects, including members formed of sheet material, such as for example, metal and glass plates. Heretofore, a great deal of difficulty has been experienced in endeavoring to carry glass plates without breaking them, since it is extremely difficult to grasp the plate in a manner to inhibit breaking thereof. Similarly, when handling other types of plate materials such as that formed from metal, plastic and the like, it may be desirable, or necessary, to handle a plate of substantial size and to move it about without scoring, or otherwise damaging the plate.

An important object of the present invention is to provide a device which may be quickly and easily engaged with objects including plate material for lifting and carrying the plate material.

Still a further object of the present invention is to provide a device for lifting and carrying objects including plate material which may be quickly and easily positioned on the plate material and which device engages or grips the plate material firmly without scoring or damaging it.

A further object of the present invention is to provide a new and improved means for carrying containers, plates and the like which can be made or formed from a single sheet or plate of metal, or other suitable material shaped substantially in the general configuration of a question mark with a handle for gripping the device.

Still another object of the present invention is to provide a device for engaging plate material and the like, which device includes surface area means thereon of relatively large size for distributing the load or weight of the plate material carried by the device to inhibit damage to the plate material or scoring thereof.

A further object is to provide a device which may be easily engaged with objects for picking them up, and which may be easily disengaged from the objects.

Other objects and advantages of the present invention will become more readily apparent from a consideration of the following description and drawings wherein:

FIG. 1 is a view illustrating a form of the invention engaged with an object such as a container for lifting it;

FIG. 2 is a side view illustrating another embodiment of the invention;

FIG. 3 is a perspective view showing a form of the invention of FIG. 2 engaged with an object such as a sheet of material; and, FIG. 4 is a perspective view illustrating a form of the invention of FIG. 2 with protective covering on the edges or jaws thereof for inhibiting damage to the material when engaged by the device.

The invention is referred to generally by the numeral 5 in FIG. 1 and is shown as including a body 7 which, in side view, is in the general configuration of a question mark. The upper body portion 7a is arcuate in configuration and provides the upper contact surface, edge or jaw 11 at one end thereof for engagement with the object to be carried. The other end of the body provides a contact surface, edge or jaw 13 thereon for also contacting the object to be carried, and a handle 15 positioned on the body 7 is provided for lifting the device 5 and the object engaged therewith.

The handle 15 extends upwardly at an angle on one side of the body portion 7a, that is, on same side of the body portion 7a as the end or jaw 11 relative to a vertical center line through the portion 7a of the device, and also the body 7 is shaped so that the lower contact surface 13 extends across the vertical center line through the body and also terminates on the same side of the center line as does the upper contact surface 11 and the point of connection of the handle 15 with the arcuate body portion 7a.

The edge 11 terminates in spaced relation to the inner surface 7c of the body 7 thereby defining an opening 9 in which may be received an object to be engaged. In FIG. 1 the object is illustrated as being in the form of a container or can 10, which can is to be lifted and carried about. It will be noted that the can 10 is provided with a lip 12 at the upper edge thereof, and the form of the invention illustrated in FIG. 1 of the drawing is best suited to function with objects which are provided with lips on their edges so that the upper contact edge 11 may engage therebeneath.

It will be noted that the container 10 is provided with the sidewalls 8 and that the upper end 8' of one of the sides is engaged in the opening 9 of the device. When the device 5 has been engaged with a wall 8 of an object such as the container 10, the upper contact surface or jaw 11 may be positioned adjacent the lip or flange 12 of the container so as to engage underneath the flange 12 as more clearly illustrated in FIG. 1 of the drawings.

The lower contact surface or jaw 13 engages the opposite side of the wall at a point lower than the point of engagement of the edge 11 beneath the flange 12.

When the device 5 is lifted in the direction as illustrated by the arrow 20, the weight of the container or object, and the relationship of the handle 15 on the body 7 to the edges 11 and 13 causes the upper contact surface 11 to be forced in one direction (toward the right as viewed in FIG. 1) so as to engage against the inner surface of the wall 8 underneath the flange 12, and this lifting force simultaneously causes the lower contact or jaw 13 to be forced in an opposite direction (toward the left as viewed in FIG. 1) and against the outside surface of the wall 8 of the container 10 so that the container 10 is thus gripped by the edges 11 and 13 and can thereby be lifted and carried to the desired location. After the container has been lifted from the ground or its resting place, the weight of the container, along with the relation of the position of the handle 15 on the body 7, and the relationship of the jaw edges 11 and 13 to the position of the handle helps to maintain the device or container 10 engaged by the jaws 11 and 13.

The handle 15 can be made separate and secured to the body 7 by any suitable means such as welding or the like, or it can be made integral with the body 7 in which event the device 5 can be cast or moulded in one piece. The device 5 can be formed of any suitable material such as rubber, plastic, wood or the like which is sufficiently strong to retain its shape during use.

As previously noted, the form of the invention shown in FIG. 1 will function better on containers or sheet material with lips or flanges; however, it will function on devices without lips or flanges.

In FIG. 2 of the drawings another modification of the invention is illustrated and it will be noted that the device is generally illustrated by the numeral 5' and includes the body designated at 7'. The body 7' is formed by the arcuate top portion 7b which is generally similar in configuration to the arcuate portion 7a of the FIG. 1 modification, with the plate or member 25 secured to one side thereof as illustrated in FIG. 2 of the drawings by means of the hinge 27. A spring 29 is mounted on the hinge 27 and abuts the arcuate portion 7b and the plate 25 as illustrated at 31' and 33 respectively so as to urge the top portion 25' of the plate in a clockwise direction as indicated, or viewed in the drawings, to rest adjacent the arcuate portion 7b next to the hinge connection 27.

A contact surface or jaw 11 is formed on the end of the arcuate surface 7b which is similar to the contact surface or jaw 11 of the FIG. 1 modification. Also a contact surface or jaw 11' is formed on the upper portion 25' of the plate 25, and a contact surface or jaw 13' is formed on the lower end of the portion 25" of the plate 25. The spaced relation of the jaw 11 to the jaw 11' forms an opening 9' in the device whereby a plate, or object may be engaged therebetween for lifting and carrying by the device. A handle 15' is secured to the arcuate portion 7b, and it will be noted that the handle 15' extends upwardly at an angle relative to an imaginary center line through the device. The handle 15' is positioned on the same side of the center line of the arcuate portion 7b as is the jaw 11.

It will be further noted that the portion 25' at the upper end of the plate 25 is bent at an angle relative to the central portion 25a of plate 25 and the lower portion 25" of plate 25 is bent in the same general direction as the top portion 25' and at an angle to the central portion 25a of the plate 25. Also, the length of the portion 25" is such that as the handle 15 is lifted when the device is engaged with an object, the edge 13' of the portion 25" of the member 25 will engage the object and thereby move the edge 11' of the upper portion 25' of the member 25 into engagement with the object at a point opposite the stationary jaw or edge 11 on the end of the arcuate portion 7b. This grasps the object between the stationary jaw 11 and the movable jaw 11', and this grasping or gripping action occurs prior to the time that the handle 15 is moved to a plane which is parallel to a plane through the jaws 11 and 11' when they are engaged with the object.

As a practical matter, it has been found that the portion 25" of member 25 will normally be bent so as to extend beyond the vertical center line of the body portion 7b and over on to the side of the body on which the handle 15 is mounted. This is best seen in FIG. 2 of the drawings since the handle 15' extends at an angle relative to the body and since the portion 25" and handle are both, in effect, on the same side of the body 7' lifting of the handle causes the body 7' to rotate in a clockwise direction as viewed in FIG. 2 so that plate 25 engages the container or object to be carried. This moves jaw 11 into engagement with the object also, so that it is gripped between jaws 11, 11' and 13'.

Attention is directed to FIG. 3 of the drawings wherein a plate or sheet 21 is illustrated which is to be grasped or carried by the device of the present invention. The plate 21 will be positioned in the opening 9' between the edges 11 and 11' as shown in FIG. 3 of the drawings. Of course, any suitable number of devices 5' will be employed depending upon the size, length, and weight of plate 21. As the handle 15' is lifted, the lower jaw 13' contacts the side 23 of the plate 21 thereby moving the jaw 11 toward the jaw 11', or relatively speaking toward each other to close opening 9', until the jaw 11' contacts the side 23 of the plate 21 opposite the jaw 11 which contacts the side 22 of the plate 21. This causes the plate 21 to be firmly grasped between the jaws 11, 11', and the relationship of the handle 15' on the body 7' to the jaws 11, 11' and 13', is such that the jaws 11 and 11' will be continually urged toward gripping action as the plate 21 is lifted and carried about.

When the plate 21 has been moved to its final destination, and set down, the device 5' may be easily and quickly removed from engagement therewith.

The FIG. 4 modification is identical with the FIG. 3 modification with the exception that padded channels 31 are fitted over each of the contact surfaces 11, 11' and 13'. The padding 31 can be made of rubber or any suitable nonskid material. The FIG. 4 modification is particularly adaptable for handling sheets or plates of glass or similar materials where it is desired or necessary to limit the possibilities of damage such as scratching, scoring, or the like.

The foregoing disclosure and description of the invention is illustrative and explanatory thereof and various changes in the size, shape and materials, as well as in the details of the illustrated construction, may be made within the scope of the appended claims without departing from the spirit of the invention.

Broadly the invention relates to a device of relatively simple construction for carrying objects.

What is claimed is:

1. A device for lifting and carrying objects comprising a body having an opening therein for receiving sheet members, said body formed of sheet material and having end portions thereon, a first end portion on said body forming an engagement surface for contacting and engaging one side of a sheet member, said first end portion on said body defining one side of the opening in said body, a second and lower end portion on said body, pivotal means on said lower end portion on said body, an angular plate connected to said body by said pivotal means, upper and lower end portions on said plate, engagement surfaces on each of said upper and lower end portions on said plate whereby the opposite side of a sheet member may be contacted and engaged, said upper end portion on said plate defines the other side of the opening in said body, each of said engaging surfaces on said body and said plate being of a sufficient width to prevent the distortion of the member contacted and engaged thereby, and handle means on said body for lifting said body whereby as said handle is lifted when in position on the sheet member said first end portion engages one side of the sheet member and said lower end portion engages the opposite side of the sheet member thereby moving said upper end portion in engagement with the sheet member to hold the member vertically in said body.

2. The structure recited in claim 1 wherein spring means is on said body and said angular plate thereby urging said upper engagement surface on said angular plate away from said upper engagement surface on said body.

References Cited in the file of this patent

UNITED STATES PATENTS

| | | |
|---|---|---|
| 615,355 | Green | Dec. 6, 1898 |
| 1,448,999 | Haarberg | Mar. 20, 1923 |
| 1,514,983 | Monnich | Nov. 11, 1924 |
| 1,516,844 | Cross | Nov. 25, 1924 |
| 1,773,628 | McGirk | Aug. 19, 1930 |
| 1,867,571 | Jelinek | July 19, 1932 |
| 1,952,444 | Leopold | Mar. 27, 1934 |
| 2,217,731 | Davis | Oct. 15, 1940 |
| 2,341,421 | Boree et al. | Feb. 8, 1944 |
| 2,549,918 | Miller | Apr. 24, 1951 |
| 2,776,856 | Ingram | Jan. 8, 1957 |